United States Patent
Takezawa

(10) Patent No.: US 7,232,241 B2
(45) Date of Patent: Jun. 19, 2007

(54) ILLUMINATION SYSTEM, PROJECTOR, AND METHOD FOR MANUFACTURING ILLUMINATION SYSTEM

(75) Inventor: Takeshi Takezawa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 204 days.

(21) Appl. No.: 10/500,295

(22) PCT Filed: Sep. 1, 2003

(86) PCT No.: PCT/JP03/11178

§ 371 (c)(1),
(2), (4) Date: Jun. 29, 2004

(87) PCT Pub. No.: WO2004/020898

PCT Pub. Date: Mar. 11, 2004

(65) Prior Publication Data

US 2005/0024879 A1    Feb. 3, 2005

(30) Foreign Application Priority Data

Aug. 30, 2002 (JP) ............................. 2002-253509
Mar. 26, 2003 (JP) ............................. 2003-084663

(51) Int. Cl.
*F21V 7/00* (2006.01)

(52) U.S. Cl. ................. 362/302; 362/297; 362/296; 362/298; 362/303; 362/304

(58) Field of Classification Search ................. 353/99; 362/298, 300, 302–303, 255–256, 261–262; 313/110, 114, 489

See application file for complete search history.

(56) References Cited

U.S. PATENT DOCUMENTS

| 5,153,752 | A  | * | 10/1992 | Kurematsu et al. | ............ 349/9 |
| 6,356,700 | B1 | * | 3/2002  | Strobl | ........................ 385/147 |
| 6,369,492 | B1 | * | 4/2002  | Sugimoto | .................... 313/113 |
| 6,540,364 | B2 | * | 4/2003  | Takizawa et al. | ............. 353/61 |

(Continued)

FOREIGN PATENT DOCUMENTS

JP    A 2-44604    2/1990

(Continued)

*Primary Examiner*—Renee Luebke
*Assistant Examiner*—Robert May
(74) *Attorney, Agent, or Firm*—Oliff & Berridge, PLC

(57) ABSTRACT

The invention provides an illumination system that can include a first reflecting mirror arranged on a rear side of a light-emitting portion of the illumination system including an arc tube, and a second reflecting mirror arranged on the front side of the light-emitting portion of an optical system. The system is arranged so that the diameter on a reflecting surface of the first reflecting mirror corresponding to the available marginal light emitted from the light-emitting portion to the rear side of the illumination system is larger than the diameter of the outer surface of the second reflecting mirror and the diameter of the outer surface of the second reflecting mirror is set to a size within the light as the available marginal light reflected by the first reflecting mirror, a reflecting surface of the second reflecting mirror surrounds about half of the front side of the light-emitting portion, and the light emitted from the center of the light-emitting portion and incident on the second reflecting mirror agrees with the normal of the second reflecting mirror.

54 Claims, 11 Drawing Sheets

U.S. PATENT DOCUMENTS

2003/0184200 A1 * 10/2003 Ookahara et al. .......... 313/113

FOREIGN PATENT DOCUMENTS

| JP | U 5-87806 | 11/1993 |
| JP | A 6-111613 | 4/1994 |
| JP | A 6-289394 | 10/1994 |
| JP | A 8-31382 | 2/1996 |
| JP | A 8-262437 | 10/1996 |
| JP | A 09-120067 | 5/1997 |
| JP | A 2001-125197 | 5/2001 |
| JP | A 2001-167621 | 6/2001 |
| JP | 2005070216 A * | 3/2005 |

* cited by examiner

ILLUMINATION SYSTEM, PROJECTOR, AND METHOD FOR MANUFACTURING ILLUMINATION SYSTEM

BACKGROUND OF THE INVENTION

1. Field of Invention

The present invention relates to an illumination system including an arc tube and a reflecting mirror for reflecting the light emitted from the arc tube and a projector including the illumination system.

2. Description of Related Art

Illumination systems including an arc tube and a reflecting mirror have been widely used. In such the illumination systems, in order to make effective use of stray light that has not been used after being emitted from the arc tube, conventionally a reflective film is formed on the arc tube, as described in JP-UM-A-5-87806 (see, for example, page 7 and FIG. 1), and also a second reflecting mirror is provided to face the reflecting mirror with the arc tube therebetween, as described in JP-A-8-31382 (see, for example, page 2 and FIG. 1).

SUMMARY OF THE INVENTION

However, the method for forming a reflective film on the front side of the arc tube has the possibility of not obtaining a desired reflection characteristic since the position between electrodes varies with respect to the reflective film adhered to the outer surface of the arc tube or since a reflection characteristic depends on the shape of the arc tube. Therefore, the method of forming the reflective film on the front side of the arc tube cannot always make effective use of light depending on the arc tube. Also with the structure in which a second reflecting mirror is separately provided so as to face an initially arranged first reflecting mirror in place of the reflective film, it is necessary to specify the arrangement and state of the second reflecting mirror in relation to the arc tube and the first reflecting mirror in order to increase light use efficiency.

It is an object of the invention to provide an illumination system capable of using most of the light emitted from an arc tube which would normally become stray light by specifying the arrangement and state of the second reflecting mirror with respect to the arc tube and the first reflecting mirror, and a projector that uses the illumination system. Another object of the invention is to provide a method of manufacturing the illumination system.

An illumination system according to the invention is an illumination system that can include an arc tube having a light-emitting portion for emitting light between electrodes and sealing portions arranged on both sides of the light-emitting portion, a first reflecting mirror arranged on the rear side of the light-emitting portion along the longitudinal direction of the arc tube, and a second reflecting mirror arranged on the front side of the light-emitting portion, the diameter D1 on the opening end of the reflecting surface of the first reflecting mirror, indicated by the available marginal light emitted to the rear side from the light-emitting portion, is larger than the diameter d1 of the outer surface of the second reflecting mirror, and the diameter d1 of the outer surface of the second reflecting mirror is set to a size within the light of the available marginal light reflected by the first reflecting mirror; and the reflecting surface of the second reflecting mirror surrounds approximately half of the front side of the light-emitting portion and the incident light emitted from the center of the light-emitting portion and entered on the second reflecting mirror and the normal of the second reflecting mirror correspond with each other. Thus, most of the light emitted from an arc tube which would normally become stray light can be returned to the first reflecting mirror to be used.

Of the light emitted from the light-emitting portion to the rear side of the illumination system, the light within an available range can be prevented from being cut off by the second reflecting mirror after being reflected by the first reflecting mirror. In addition, the following effects are offered: the first reflecting mirror can be reduced in size to obtain an equal amount of light. Also, since the diameter of the spot of light collected by the first reflecting mirror can be reduced, the light can easily enter the following optical system, thus increasing light use efficiency. With such a structure, since the arc tube can be protruded from the first reflecting mirror, the cooling performance can be increased by applying a cooling air passing through the illumination system directly to the arc tube.

The available marginal light may be marginal light determined depending on the structure of the arc tube. In such a case, almost all of the light emitted from the light-emitting portion to the rear side of the illumination system can be used.

Another illumination system according to the invention is an illumination system can include an arc tube having a light-emitting portion for emitting light between electrodes and sealing portions arranged on both sides of the light-emitting portion, a first reflecting mirror arranged on the rear side of the light-emitting portion along the longitudinal direction of the arc tube, and a second reflecting mirror arranged on the front side of the light-emitting portion. A diameter D1 on the opening end of the reflecting surface of the first reflecting mirror, indicated by the available marginal light emitted to the rear side from the light-emitting portion, is larger than the diameter d1 of the outer surface of the second reflecting mirror, and the diameter d1 of the outer surface of the second reflecting mirror is set to a size within the light of the available marginal light reflected by the first reflecting mirror. The second reflecting mirror can be arranged so that the incident light emitted from the center of the light-emitting portion and entered on the second reflecting mirror and the normal of the second reflecting mirror correspond with each other, and the diameter D2 at the opening end of the reflecting surface of the first reflecting mirror is within the range that satisfies θe>θd when θd is approximated as:

$$\theta d = 90° + \tan^{-1}\{(Le/2 + Lr)/(d2/2)\}$$

where Le is the distance between the ends of the electrodes, Lr is the distance on the optical axis of the illumination system from the center F1 between the ends of the electrodes to the opening end of the reflecting surface of the second reflecting mirror, d2 is the diameter of the opening end of the outer surface of the second reflecting mirror, D2 is the diameter of the opening end of the reflecting surface of the first reflecting mirror, θd is the angle formed between the light emitted from the end of the electrode of the electrode ends adjacent to the first reflecting mirror without interception by the second reflecting mirror and the straight line of the optical axis of the illumination system extending toward the rear side of the illumination system, and θe is the angle included between the line connecting the opening end of the reflecting surface of the first reflecting mirror with the end of the electrode adjacent to the first reflecting mirror and the straight line that is extended the optical axis of the illumination system toward the rear side of the illumination system.

Also the light that emits forward without being reflected by the second reflecting mirror can be used by setting the diameter of the opening end of the reflecting surface of the first reflecting mirror in that way.

Another illumination system according to the invention is an illumination system the can include an arc tube having a light-emitting portion for emitting light between electrodes and sealing portions arranged on both sides of the light-emitting portion, a first reflecting mirror arranged on the rear side of the light-emitting portion along the longitudinal direction of the arc tube, and a second reflecting mirror arranged on the front side of the light-emitting portion. A diameter D1 on the opening end of the reflecting surface of the first reflecting mirror, indicated by the available marginal light emitted to the rear side from the light-emitting portion, is larger than the diameter d1 of the outer surface of the second reflecting mirror. The diameter d1 of the outer surface of the second reflecting mirror is set to a size within the light of the available marginal light reflected by the first reflecting mirror. The second reflecting mirror can be arranged so that the light emitted from the center of the light-emitting portion and incident on the second reflecting mirror and the normal of the second reflecting mirror correspond with each other, and the diameter D2 of the opening end of the reflecting surface of the second reflecting mirror has a size that is possible to reflect the boundary light of the light emitted from the end of the arc generating between the electrodes adjacent to the first reflecting mirror without interception by the second reflecting mirror.

The diameter of the opening end of the reflecting surface of the first reflecting mirror sets in that way, thus the light that emits forward without being reflected by the second reflecting mirror can be used and the diameter of the opening end of the reflecting surface of the first reflecting mirror can be set at the minimum.

In the illumination system, the second reflecting mirror is preferably arranged to the outer periphery of the light-emitting portion with a space therebetween. With such a structure, the relative position between the light-emitting portion and the second reflecting mirror can be adjusted within the space as adjustment width on the occasion when the incident light emitted from the center of the light-emitting portion and entered on the second reflecting mirror is correspond with the normal of the second reflecting mirror. Since heat is not held between the second reflecting mirror and the light-emitting portion owing to the space, an excessive increase in temperature of the light-emitting portion can be prevented.

In the illumination system, the reflecting surface of the second reflecting mirror is preferably formed of a dielectric multilayer that transmits ultraviolet light and infrared light. Therefore, the light-emitting portion, the reflecting surface of the first reflecting mirror, optical components on which the light from the illumination system is incident and so on are prevented from degradation due to ultraviolet light and infrared light since only visible light is reflected to the first reflective mirror. Since the second reflecting mirror can efficiently reflect visible light that is used for actual illumination, it can increase the luminance of the illumination system.

In the illumination system, the reflecting surface of the second reflecting mirror is preferably formed by end surface-grinding or press-molding a pipe having an inside diameter larger than the outside diameter of the sealing portion. This reduces complicated labor and trouble in processing the reflecting surface.

In the illumination system, the outer surface of the second reflecting mirror is preferably formed so as to allow the light incident from the reflecting surface side to transmit or to diffuse-reflect the light incident from the reflecting surface side whereby the light is not absorbed by the second reflecting mirror. This prevents an increase in temperature of the second reflecting mirror due to the light such as infrared light incident from the reflecting surface of the second reflecting mirror.

In the illumination system, the second reflecting mirror is preferably made of any of quartz, light-transmissive alumina, crystal, sapphire, YAG, and fluorite. The materials can provide the second reflecting mirror with uniform temperature distribution because of high thermal conductivity, high thermal resistance because of low thermal expansivity, and high transmittance for infrared and ultraviolet lights.

In the illumination system, the outer periphery of the light-emitting portion is preferably coated with antireflection coating. This reduces light loss due to the reflection of the light passing via the second reflecting mirror at the light-emitting portion.

In the illumination system, the second reflecting mirror is preferably fixed to the surface of the sealing portion in the vicinity of the light-emitting portion with an adhesive. Thereby, the second reflecting mirror can be fixed to the arc tube with minimum interception of the light emitted from the light-emitting portion and reflected by the first reflecting mirror and the light emitted from the light-emitting portion and passing through the second reflecting mirror.

When the adhesive is an inorganic adhesive having a mixture of silica and alumina or aluminum nitride, nonuniform temperature distribution of the second reflecting mirror and the arc tube can be reduced because of their high thermal conductivity.

In the illumination system, the second reflecting mirror is preferably fixed by pressuring to the vicinity of the light-emitting portion of the arc tube with a spring wound around the outer circumference of the sealing portion with a space therebetween. Therefore, even if the arc tube expands with heat, its thermal deformation can be absorbed by the space.

When the spring is formed of a conductive winding and the conductive winding is connected with a lead wire extending from the sealing portion on the side opposite to the side on which the spring is disposed, the spring can be used as a breakdown trigger to increase lighting up performance.

A projector according to the invention is a projector including an optical modulator for modulating an incident light from an illumination system in accordance with given image information, the illumination system according to any of the foregoing as the illumination system. Thus a compact and high-luminance projector is provided.

A method for manufacturing an illumination system according to the invention is an illumination system that can include an arc tube having a light-emitting portion for emitting light between electrodes and sealing portions arranged on both sides of the light-emitting portion, a first reflecting mirror arranged on the rear side of the light-emitting portion along the longitudinal direction of the arc tube and serving as a main reflecting mirror, and a second reflecting mirror arranged on the front side of the light-emitting portion and serving as an auxiliary reflecting mirror. The method can include the steps of fixing the arc tube and the second reflecting mirror together, after adjusting the relative position between the second reflecting mirror and the arc tube such that the real images of the electrodes or the real image of an interelectrode arc of the arc tube overlap with the reflected images of the electrodes or the reflected image of the interelectrode arc reflected by the second reflecting mirror, and fixing the arc tube and the first reflecting mirror together, after arranging the arc tube and the first reflecting mirror such that the center of the electrodes of the arc tube having the second reflecting mirror fixed thereto substantially agrees with a first focus of the first reflecting mirror and adjusting the relative position between the arc tube and the first reflecting mirror so that the luminance of the first reflecting mirror is maximum in a specified position.

In the method for manufacturing the illumination system, preferably, the step of fixing the arc tube and the second reflecting mirror together includes the process of detecting the real image and the reflected image from at least two directions by using a pickup image with a camera, adjusting the position of the second reflecting mirror so that the real image overlaps with the reflected image in each direction, and fixing the arc tube and the second reflecting mirror together.

In the method for manufacturing the illumination system, preferably, the specified position is a design second focus of the first reflecting mirror, and the step of fixing the arc tube and the first reflecting mirror together can include the process of fixing the arc tube and the first reflecting mirror together after adjusting the relative position between the arc tube and the first reflecting mirror so that the luminance in the vicinity of the design second focus of the first reflecting mirror is maximum.

In the method for manufacturing the illumination system, preferably, the specified position is the position at which an illumination object of an optical system that mounts the illumination system is arranged, and the step of fixing the arc tube and the first reflecting mirror together can include the process of fixing the arc tube and the first reflecting mirror together after incorporating the illumination system to the optical system and adjusting the relative position between the arc tube and the first reflecting mirror so that the luminance at the position in which the illumination object is arranged, becomes maximum. Thus, an illumination system having a second reflecting mirror with higher light-use efficiency can be manufactured.

BRIEF DESCRIPTION OF THE DRAWINGS

The invention will be described with reference to the accompanying drawings, wherein like numerals reference like elements, and wherein.

DETAILED DESCRIPTION OF PREFERRED EMBODIMENTS

Figure 1:
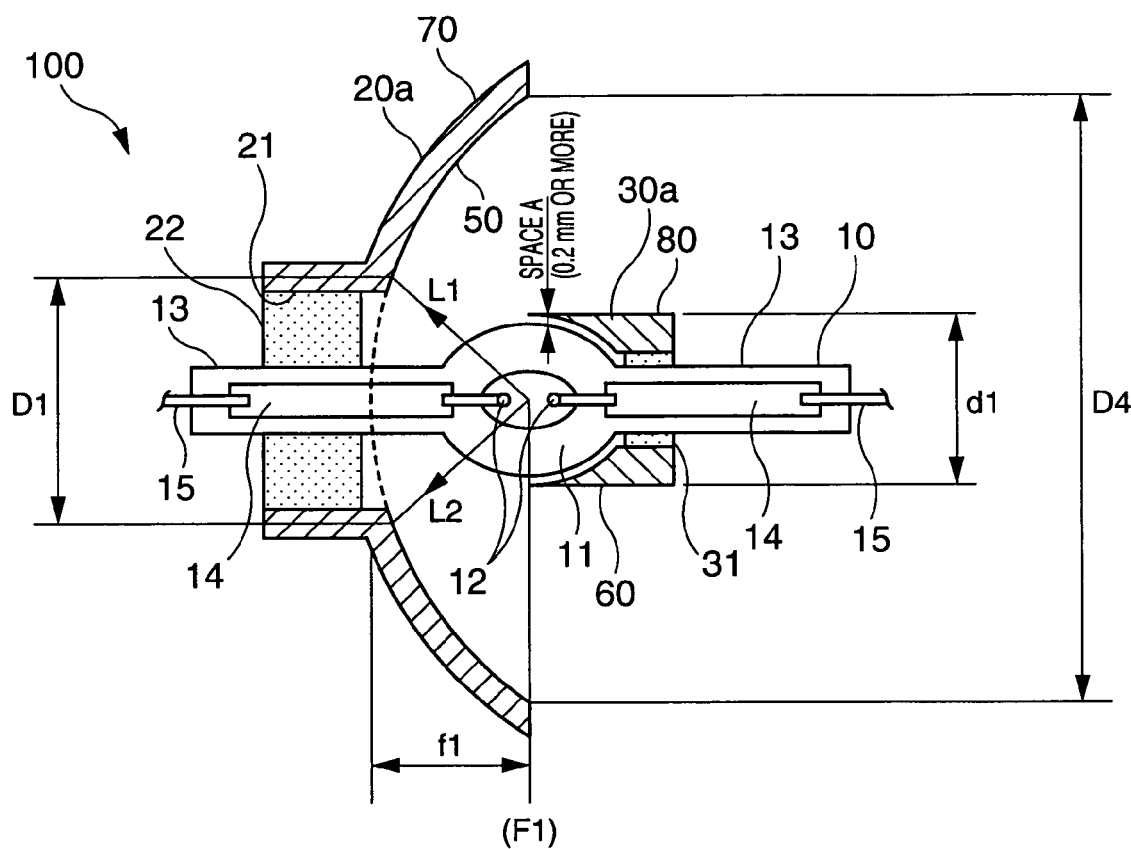
FIG. 1 is a schematic diagram of an illumination system according to a first embodiment of the present invention.

Referring to the drawings, embodiments of the invention will be described hereinafter. In the drawings, the same numerals indicate the same or corresponding elements.

Figure 2:
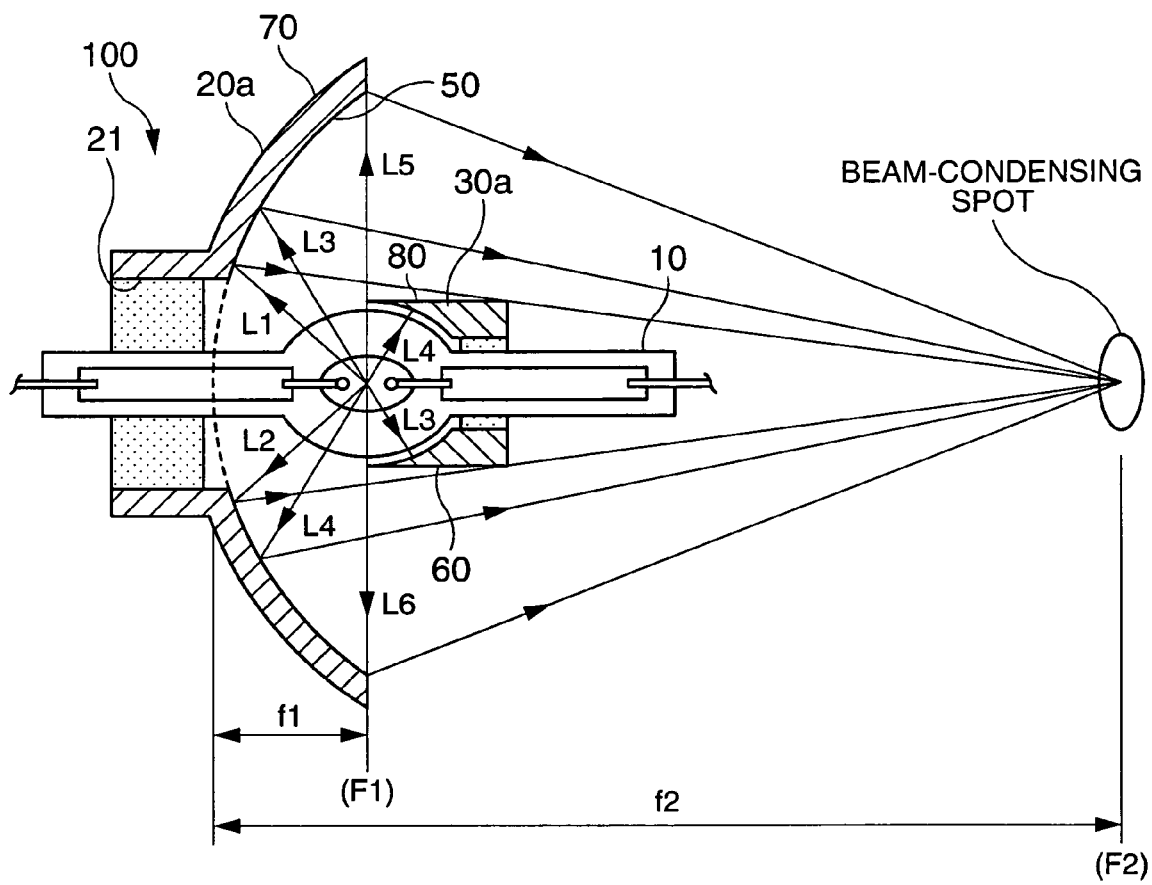
FIG. 2 is an explanatory diagram of the operation of the illumination system of FIG. 1.

FIG. 1 is a schematic diagram of an illumination system 100 according to a first embodiment of the invention, and FIG. 2 is an explanatory diagram of the operation of the illumination system 100 of FIG. 1. The illumination system 100 includes an arc tube 10, a first reflecting mirror 20a serving as a main reflecting mirror of the illumination system 100, and a second reflecting mirror 30a serving as an auxiliary reflecting mirror of the illumination system 100. The arc tube 10 is made of quartz glass or the like and includes therein tungsten electrodes 12 and 12, a central light-emitting portion 11 sealed with mercury, rare gas, and a small amount of halogen, and sealing portions 13 and 13 on both sides of the light-emitting portion 11. The sealing portions 13 each contain metal foil 14 made of molybdenum which is connected to the electrode 12. Each leaf of the metal foils 14 and 14 includes lead wires 15 and 15 connecting to the exterior. The targets of the connection of the lead wires 15 and 15 may be the same as those of the conventional one. For example, they are connected to external connection terminals of illumination-system fasteners (not shown) or the like.

When the outer circumference of the light-emitting portion 11 is coated with antireflective coating of a multilayer including a tantalum oxide film, a hafnium oxide film, and titanium oxide film or the like, light loss due to the reflection of light that passes therethrough can be reduced.

A reflecting surface 50 of the first reflecting mirror 20a is of rotating curved shape. Reference symbols F1 and F2 indicate a first focus and a second focus of the rotating curve of the reflecting surface 50 of the first reflecting mirror 20a, respectively. Reference symbols f1 and f2 indicate the distance from the top of the rotating curve of the reflecting surface 50 of the first reflecting mirror 20a to the first focus F1 and the second focus F2, respectively. The reflecting surface 50 of the first reflecting mirror 20a may be of rotating ellipsoidal shape or of rotating parabolic shape. In the illumination system 100 including the arc tube 10, the first reflecting mirror 20a serves as a reflecting element arranged on the rear side of the arc tube 10 and has a through hole 21 for fixing the arc tube 10 in the center of the end on the rear side. The arc tube 10 is firmly fixed to the through hole 21 of the first reflecting mirror 20a with an inorganic adhesive 22, such as cement, with the axis of the arc tube 10 and the axis of the first reflecting mirror 20a agreed with each other.

The axis of the arc tube 10 is a longitudinal central axis of the arc tube 10 and agrees substantially with the direction of the electrodes 12 and 12. The axis of the first reflecting mirror 20a is a rotation axis of the rotating curve constituting the reflecting surface 50 of the first reflecting mirror 20a and agrees substantially with the central axis of the light beams emitted from the illumination system 100. The center of the light-emitting portion 11 of the arc tube 10 (the center between the electrodes 12 and 12) is agreed with or located near the first focus (F1) when the reflecting surface 50 of the first reflecting mirror 20a is of rotating ellipsoidal shape, while it is agreed with or located near the focus F when the reflecting surface 50 of the first reflecting mirror 20a is of rotating parabolic shape. In other words, the center of the light-emitting portion 11 is arranged near the focus F1 or F of the first reflecting mirror 20a or substantially in agreement with the position of the focus F1 or F.

In the illumination system 100 including the arc tube 10, the second reflecting mirror 30a serves as a reflecting element arranged on the front side of the arc tube 10 and is arranged so that its reflecting surface 60 surrounds about half of the front side of the light-emitting portion 11 and the light emitted from the center of the light-emitting portion 11 and entering the reflecting surface 60 of the second reflecting mirror 30a agrees with the normal line of the reflecting surface 60 of the second reflecting mirror 30a. The second reflecting mirror 30a is fixed to the sealing portion 13 with an adhesive 31. Since the structure of the light-emitting portion 11 (the position between the electrodes 12 and the shape of each part of the light-emitting portion 11) is different for each arc tube 10 because of variations in manufacture, it is preferable to determine the shape of the reflecting surface 60 of the second reflecting mirror 30a for each arc tube 10 depending on the relation to the light-emitting portion 11.

Since the second reflecting mirror 30a is exposed to high temperatures of about 900° C. to 1000° C., it must be made of a material with low thermal expansivity or high heat conductivity. Therefore, the second reflecting mirror 30a is made of, for example, a low-thermal-expansion material, such as quartz or neoceram, or a high-heat-conduction material, such as light-transmissive alumina, sapphire, crystal, fluorite, and YAG (Yttrium Aluminum Garnet). The light-transmissive alumina may be, for example, "Sumicorundum" (a trademark registered by Sumitomo Chemical Co., Ltd.).

When the reflecting surface 60 of the second reflecting mirror 30a can reflect only visible light used for illumination and allow ultraviolet light and infrared light which are unnecessary for illumination to pass through, heat generation of the second reflecting mirror 30a can be reduced. Therefore, a dielectric multilayer that reflects only visible light and allows ultraviolet light and infrared light to pass through is deposited on the reflecting surface 60 of the second reflecting mirror 30a. The dielectric multilayer also requires heat resistance and can be made of, for example, a crosswise deposit of a tantalum compound and silicon dioxide or a crosswise deposit of a hafnium compound and silicon dioxide. In consideration of the foregoing factors, it is preferable to make the second reflecting mirror 30a of any of the materials with low thermal expansivity or high heat conductivity and which easily transmit ultraviolet light and infrared light therethrough, such as quartz, translucent alumina, crystal, sapphire, YAG ($Y_3Al_5O_{12}$), and fluorite.

An outer surface 80 of the second reflecting mirror 30a is provided with a reflective film and a shape so as to transmit the light incident thereon without being reflected by the reflecting surface 60 (infrared light, ultraviolet light, and visible light leaking from the reflecting surface 60, etc.) or to diffuse and reflect the light incident thereon without being reflected by the reflecting surface 60 so that the second reflecting mirror 30a absorbs light as little as possible.

As shown in FIG. 1, the diameter d1 of the outer surface 80 of the second reflecting mirror 30a is set so that the diameter D1 of the reflecting surface 50 of the conical first reflecting mirror 20a, which is indicated by the available marginal lights L1 and L2 emitted from the light-emitting portion 11 toward the first reflecting mirror 20a, or toward the rear side of the illumination system 100, is larger than the diameter d1 of the outer surface 80 of the second reflecting mirror 30a and that the diameter d1 of the outer surface 80 of the second reflecting mirror 30a has a size within a cone formed by the light of the available marginal lights L1 and L2 reflected by the first reflecting mirror 20a. With this arrangement, of the light emitted from the light-emitting portion 11 toward the rear side of the illumination system 100, the light within the available range is reflected by the first reflecting mirror 20a and then travels without being shut off by the second reflecting mirror 30a.

The available marginal lights L1 and L2 refer to light corresponding to the inside boundary of the range to be actually used as illuminating light of the light emitted from the light-emitting portion 11 to the rear side of the illumination system 100, which are determined depending on the structure of the arc tube 10 or, alternatively, depending on the structure of the first reflecting mirror 20a. The available marginal light determined depending on the structure of the arc tube 10 refers to effective light at the boundary with the light that is shut off by the effects of the sealing portion 13 or the like, of the light emitted from the light-emitting portion 11 toward the first reflecting mirror 20a, or the rear side, as effective light without interception by the effect of the sealing portion 13 or the like. The available marginal light determined depending on the structure of the first reflecting mirror 20a refers to effective light at the boundary with the light that cannot be reflected by the reflecting surface 50 owing to the first reflecting mirror 20a because of the presence of the through hole 21 of the first reflecting mirror 20a and so cannot be used as illuminating light, of the light emitted from the light-emitting portion 11 toward the first reflecting mirror 20a, or to the rear side of the illumination system 100, as effective light without interception by the effect of the sealing portion 13 or the like. According to the embodiment, when the available marginal light is the marginal light determined depending on the structure of the arc tube 10, almost all of the light emitted from the light-emitting portion 11 toward the rear side of the illumination system 100 can be used.

As the diameter d1 of the outer surface 80 of the second reflecting mirror 30a increases, the light use efficiency is reduced because the interception of advancing light is increased after the reflection by the first reflecting mirror 20a. Therefore, the diameter d1 of the outer surface 80 of the second reflecting mirror 30a must be minimized to avoid the reduction in light use efficiency.

It is preferable to provide a clearance, or a clearance A of 0.2 mm or more, such that the position of the second reflecting mirror 30a can be adjusted with respect to the light-emitting portion 11 to control the positional relationship between the light-source image and the reflected image, between the outer circumference of the light-emitting portion 11 and the reflecting surface 60 of the second reflecting mirror 30a. Therefore, the relative position between the light-emitting portion 11 and the second reflecting mirror 30a can be adjusted so that the light-source image agrees with the reflected image and the heat radiation of the light-emitting portion 11 and the arc tube 10 which are covered with the second reflecting mirror 30a can be ensured. Thus, an excessive increase in temperature of the arc tube 10 can be restrained. Thus, exhaustion of the electrodes 12 and cloudiness and expansion of the arc tube 10 including the light-emitting portion 11 due to an increase in temperature can be prevented.

Referring to FIG. 2, with the illumination system 100 of the embodiment, as described above, the light L1, L2, L5, and L6 emitted from the light-emitting portion 11 of the arc tube 10 toward the rear side are reflected by the first reflecting mirror 20a and travel forward of the illumination system 100. Light L3 and L4 emitted from the light-emitting portion 11 to the front side are reflected by the reflecting surface 60 of the second reflecting mirror 30a to be returned to the first reflecting mirror 20a and are then reflected by the first reflecting mirror 20a to advance forward of the illumination system 100. This allows most of the light emitted from the light-emitting portion 11 to be used.

Since the illumination system 100 of the embodiment uses the second reflecting mirror 30a, the diameter D4 of the reflecting surface 50 of the first reflecting mirror 20a can be smaller than that of an illumination system without the second reflecting mirror.

Figure 3:
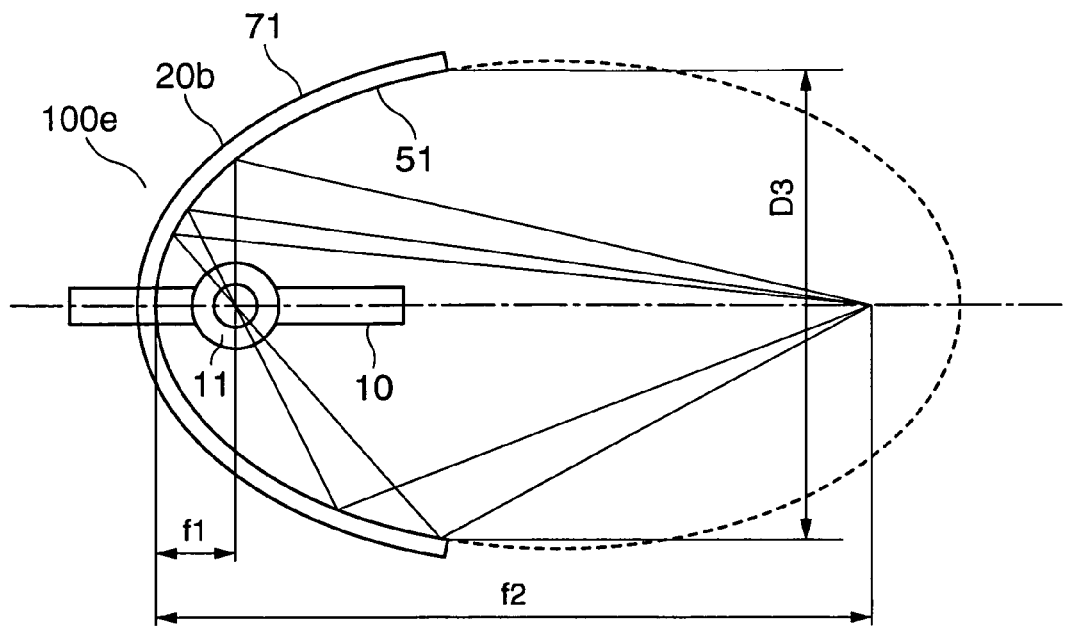
FIG. 3 is a comparative explanatory diagram of the diameter of the reflecting surface of a first reflecting mirror depending on the presence of a second reflecting mirror.
Figure 3:
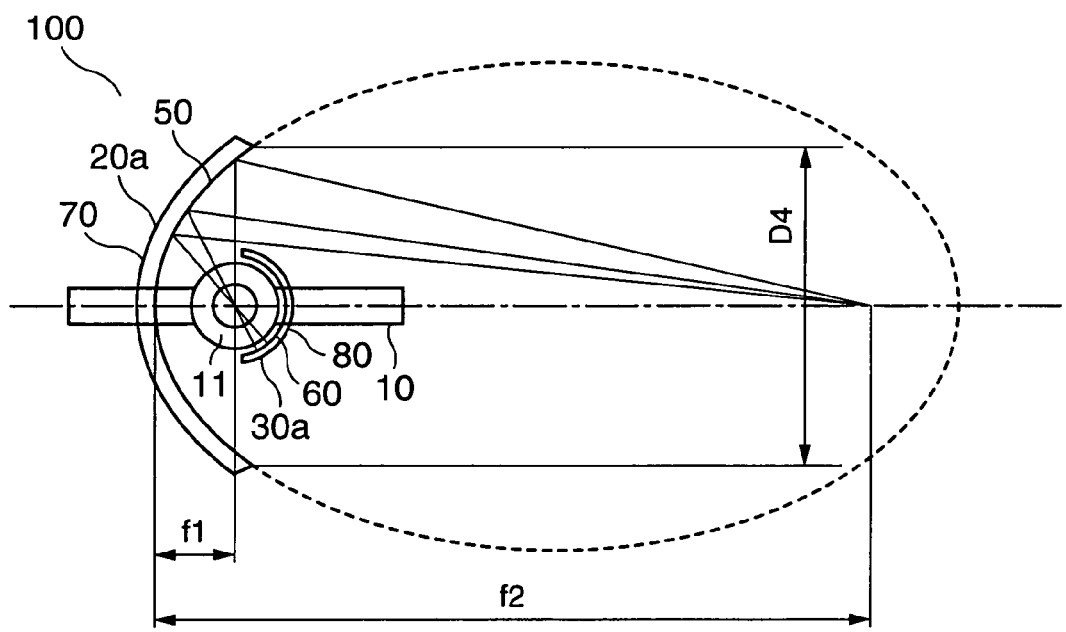

This will be described with reference to FIG. 3. FIG. 3(a) shows an illumination system 100e without the second reflecting mirror; and FIG. 3(b) shows the illumination system 100 with the second reflecting mirror 30a. A first focal length f1 and a second focal length f2 of rotating ellipsoidal shape of the respective reflecting surfaces 51 and 50 of the first reflecting mirrors 20b and 20a are equal. Referring to FIG. 3(b), when the second reflecting mirror 30a is used, the light emitted from the light-emitting portion 11 to the front side is reflected by the second reflecting mirror 30a and incident on the reflecting surface 50 of the first reflecting mirror 20a, so that the diameter D4 of the opening end of the reflecting surface 50 of the first reflecting mirror 20a can be smaller than the diameter D3 of the opening end of the reflecting surface 51 of the first reflecting mirror 20b without the second reflecting mirror 30a (D4<D3). However, since the magnification relationship of f2/f1 does not change, the diameters of the beam-condensing spots thereof are equal, thus causing no change of the efficiency of the optical system.

Since the illumination system 100 of the embodiment uses the second reflecting mirror 30a, the diameter of the beam-condensing spot of the illumination system can be reduced in size as compared with that without the second reflecting mirror.

Figure 4:
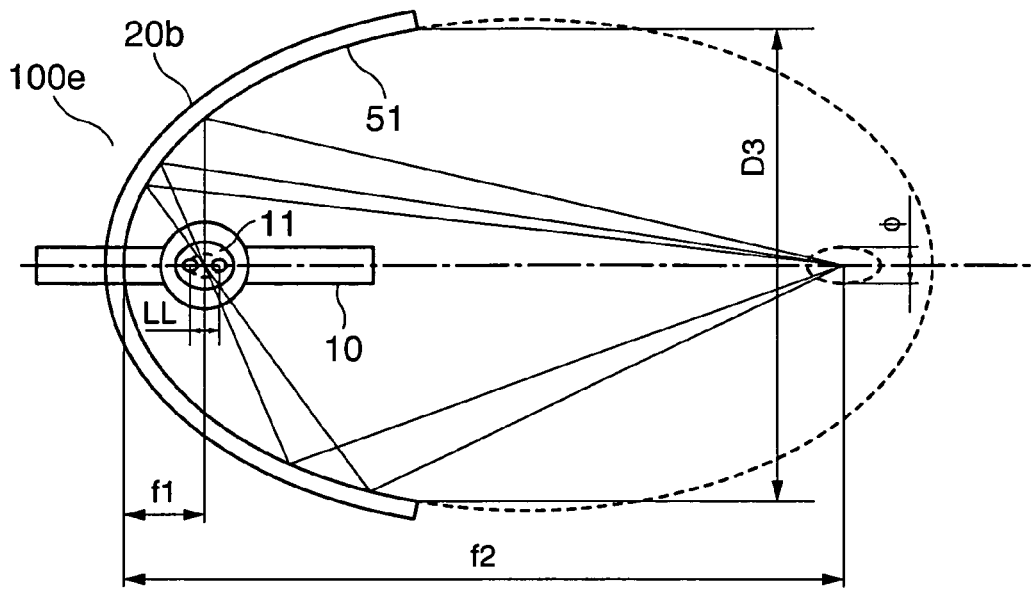
FIG. 4 is a comparative explanatory diagram of the diameter of a beam-condensing spot of the illumination system depending on the presence of the second reflecting mirror.
Figure 4:
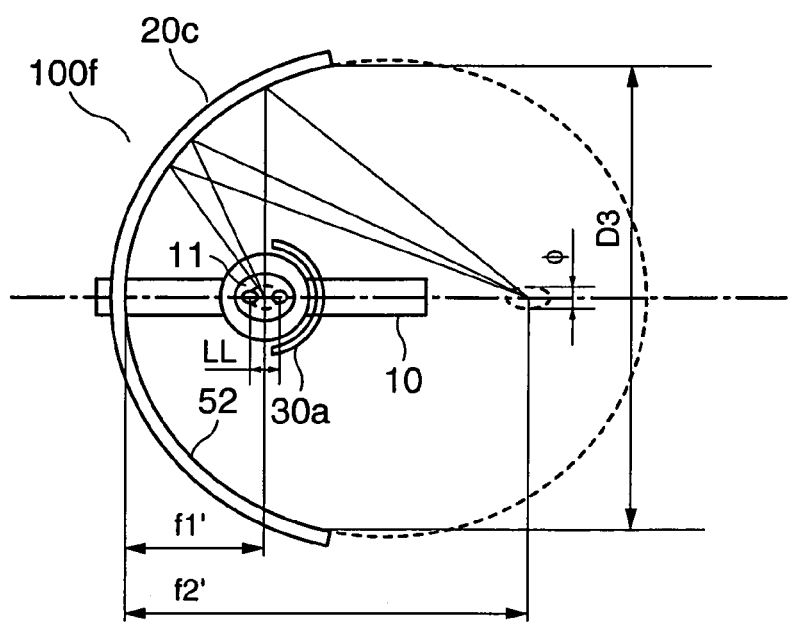

The beam-condensing spot diameter will first be described. If the arc of the light-emitting portion 11 is a point, the beam-condensing spot would also be a point. Thus, even if the focal length of the first reflecting mirrors with the same diameter of the opening end of the reflecting surface is varied, the diameter of the beam-condensing spot is not varied. However, the arc is finite in actuality. Referring to FIG. 4(b), the beam-condensing spot diameter φ is determined by the product of the arc diameter LL and f2'/f1', where LL is the diameter of a finite arc, φ is the diameter of the beam-condensing spot at that time, f1' is the distance from the top of the rotating curve of a reflecting surface 52 of a first reflecting mirror 20c to a first focus, and f2' is the distance from the top of the rotating curve of the reflecting surface 52 of the first reflecting mirror 20c to a second focus. Therefore, at the first reflecting mirror 20b in FIG. 4(a) and the first reflecting mirror 20c in FIG. 4(b) with the same diameter D3 of the opening end of the reflecting surface, the magnification relationship between the focuses f1 and f2 of the reflecting surface 51 of the first reflecting mirror 20b and the focuses f1' and f2' of the reflecting surface 52 of the first reflecting mirror 20c is expressed as (f2/f1)>(f2'/f1'); thus, the beam-condensing spot diameter of the first reflecting mirror 20c in FIG. 4(b) is smaller than the beam-condensing spot diameter of FIG. 5(a). Here, as the focal lengths f1 and f2 of the first reflecting mirror 20b of FIG. 4(a) approach the focal lengths f1' and f2' of the first reflecting mirror 20c of FIG. 4(b), the light that does not enter the reflecting surface 51 of the first reflecting mirror 20b increases, thus reducing illumination efficiency. However, an illumination system 100f including the second reflecting mirror 30a in FIG. 4(b) can prevent light loss by using the second reflecting mirror 30a and facilitate letting the light incident on an optical system following the illumination system 100f by decreasing the beam-condensing spot diameter, thus increasing the use efficiency of light emitted from the light-emitting portion 11.

Figure 5:
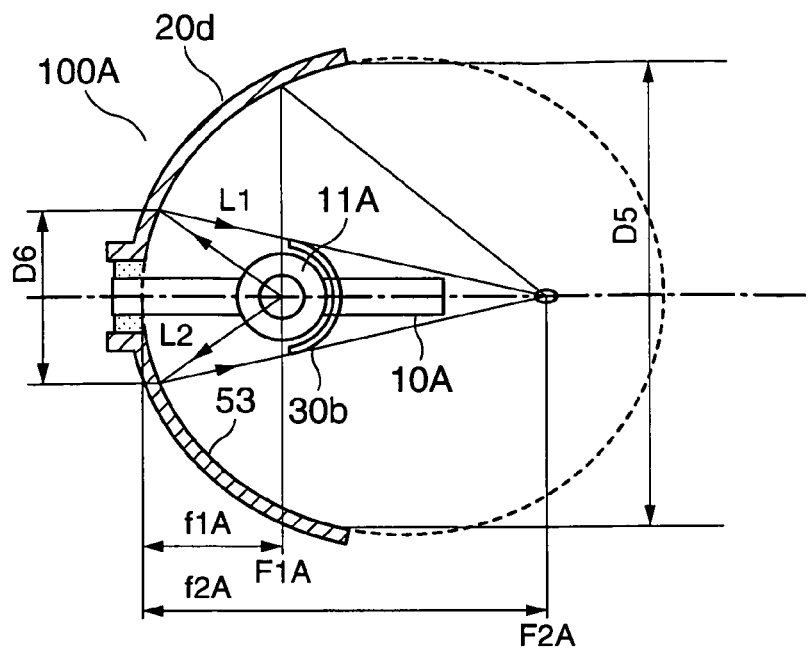
FIG. 5 is a schematic operation diagram of an illumination system according to a second embodiment of the invention.
Figure 5:
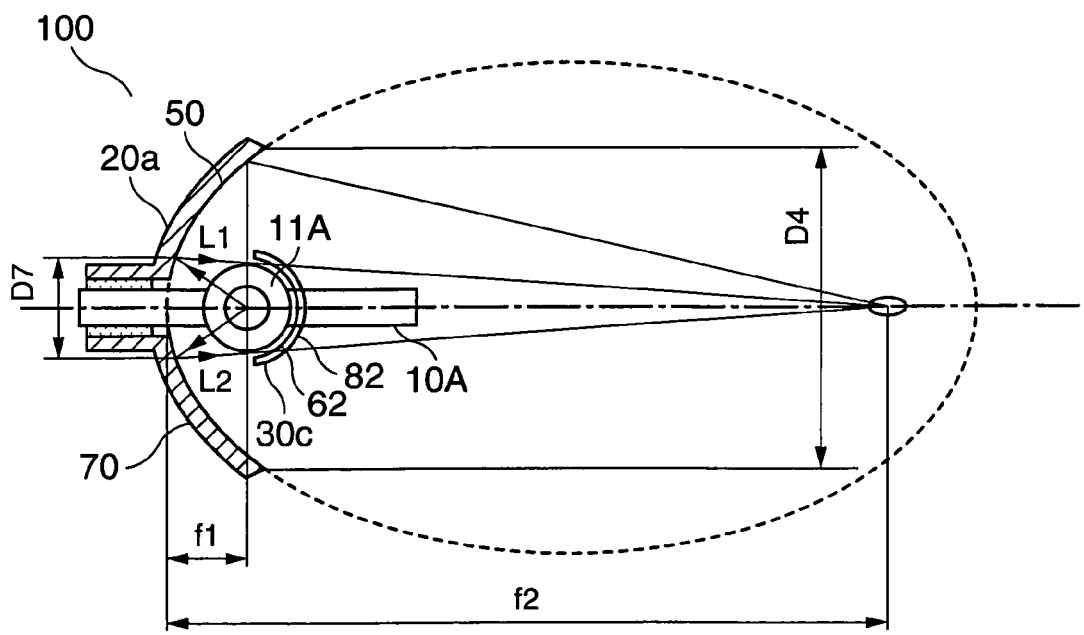

FIG. 5(a) is a schematic operation diagram of an illumination system 100A according to a second embodiment of the invention. The structure of the illumination system 100A is in principle the same as that of the illumination system 100 of FIG. 1 and different in that a focal length f1A of a reflecting surface 53 of a first reflecting mirror 20d of the illumination system 100A is larger than the focal length f1 of the reflecting surface 50 of the first reflecting mirror 20a of the illumination system 100 (f1<f1A) and a focal length f2A of the reflecting surface 53 of the first reflecting mirror 20d of the illumination system 100A is smaller than the focal length f2 of the reflecting surface 50 of the first reflecting mirror 20a of the illumination system 100 (f2>f2A). In the drawing, symbol f1A denotes the distance from the top of the rotating curve of the reflecting surface 53 of the first reflecting mirror 20d to a first focus F1A and symbol f2A denotes the distance from the top of the reflecting surface 53 of the first reflecting mirror 20d to a second focus F2A. Therefore, the diameter D5 of the opening end of the reflecting surface 53 of the first reflecting mirror 20d is larger than the diameter D4 of the opening end of the reflecting surface 50 of the first reflecting mirror 20a in FIG. 1, whereas the beam-condensing spot diameter at the second focus F2A of the illumination system 100A is smaller than the beam-condensing spot diameter at the second focus F2 of the illumination system 100. Therefore, the light emitted from the illumination system 100A is easily incident in the following optical system, thus increasing light use efficiency.

When a large-sized arc tube 10A with high luminance is used, the second reflecting mirror must also be increased in size in accordance with increasing size of the arc tube 10A. As a result, the illumination system 100 of FIG. 5(b) shuts off the light of the available marginal lights L1 and L2 determined depending on the structure of the arc tube 10A, which is reflected from the first reflecting mirror 20a, with a second reflecting mirror 30c. However, since the illumination system 100A has the focal length f1A larger than the focal length f1, the diameter D6 of the reflecting surface 53 of the conical second reflecting mirror 20d, which is indicated by the available marginal lights L1 and L2 determined depending on the structure of the arc tube 10A, is larger than the diameter D7 of the reflecting surface 50 of the second reflecting mirror 20a of the illumination system 100, so that the light of the available marginal lights L1 and L2 reflected by the first reflecting mirror 20d can be used as effective light without being shut off by a second reflecting mirror 30b, thus increasing the use efficiency of the light from the high-power arc tube with high luminance.

When the amount of heat generated from a light-emitting portion 11A is equal, the area where the first reflecting mirror 20d receives radiant heat is determined by the product of the square of f1A/f1, the ratio of the area where the first reflecting mirror 20a receives radiant heat to the focal length, so that the radiant heat to the first reflecting mirror 20d per unit area is in inverse proportion to the square of f1 A/f1. Therefore, the illumination system 100A of the embodiment has the radiant heat to the first reflecting mirror 20d per unit area from the arc tube 10A is less than that to the first reflecting mirror 20a, thus preventing an increase in temperature of the first reflecting mirror 20d.

Figure 6:
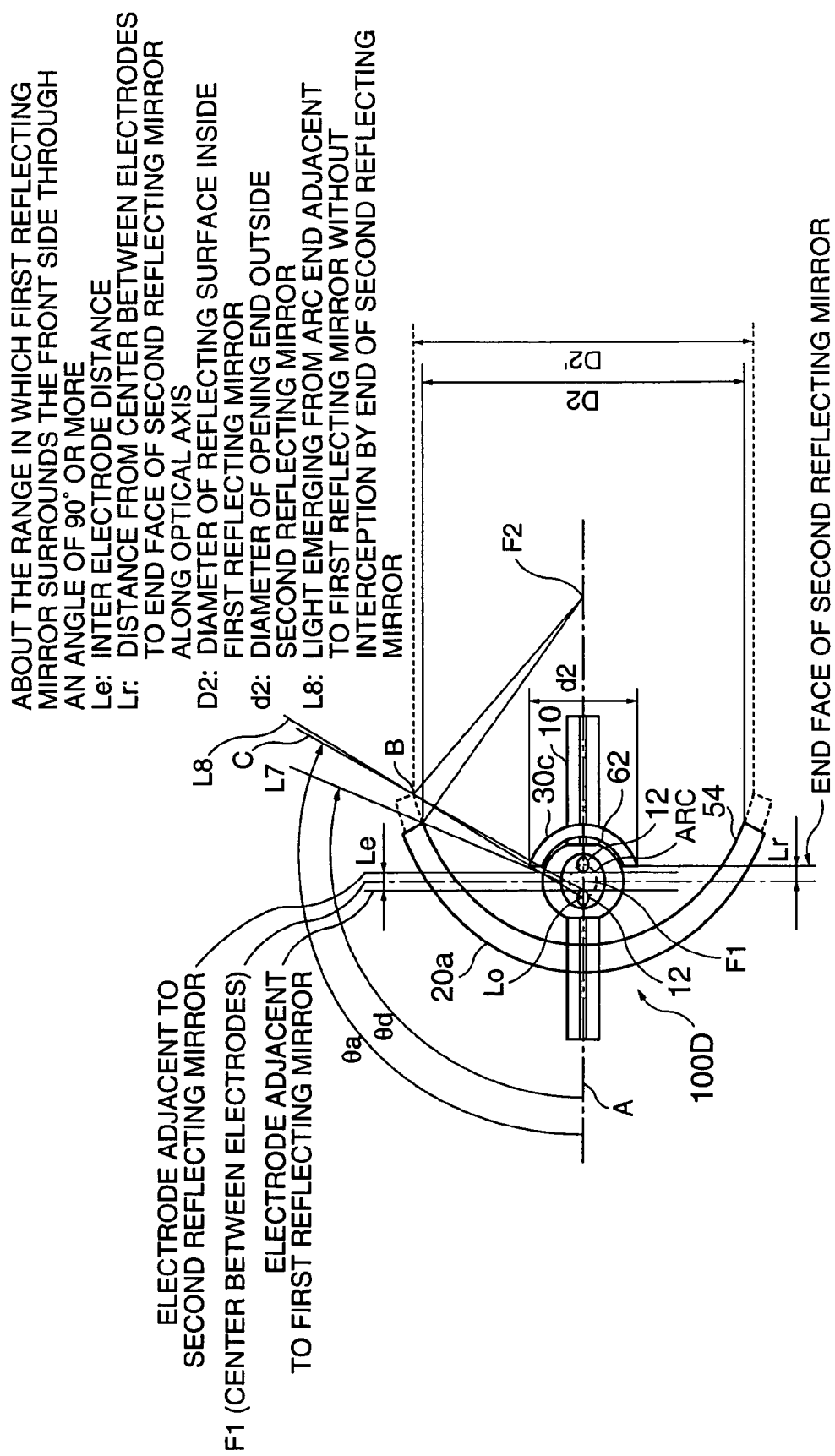
FIG. 6 is a schematic diagram of an illumination system according to a third embodiment of the invention.

FIG. 6 is a schematic diagram of an illumination system 100D according to a third embodiment of the present invention. The same elements of the illumination system 100D as those of FIG. 1 are given the same numerals and their description will be omitted and different points will be described hereinafter. Here when the end of the opening end of a reflecting surface 62 of the second reflecting mirror 30c does not reach the center between the electrodes 12 and 12, in contrast to the first embodiment or the second embodiment, the light reflection area of a first reflecting mirror 20e is determined. In FIG. 6, let Le be the distance between the ends of the electrodes 12 and 12, Lr be the distance on the optical axis from the center F1 (a first focus of the first reflecting mirror 20e) between the ends of the electrodes 12 and 12 to the opening end of the second reflecting mirror 30b, d2 be the diameter of the opening end of the outer surface of the second reflecting mirror 30b, D2 be the diameter of the opening end of a reflecting surface 54 of the first reflecting mirror 20e, A be the central axis of the light emitted from the illumination system 100D, or the optical axis of the illumination system 100D, and θd be the angle formed by boundary light L7 of the light emitted from the end of the electrode 12 of the pair of electrodes 12 and 12, adjacent to the first reflecting mirror 20e without interception by the second reflecting mirror 30b and the straight line of the optical axis A of the illumination system 100D extending toward the rear side of the illumination system 100D. In FIG. 6, θd is the angle from the optical-axis extension A of the rear side of the electrode 12 adjacent to the first reflecting mirror 20e to the boundary light L7 in a clockwise direction. Thus, the angle θd can be approximated by the equation 1:

$$\theta d 90° + \tan^{-1}\{(Le/2+Lr)/(d1/2)\}$$  Equation 1

Here since the arc tube 10 is made of glass, the light emitted from an actual arc image is refracted because of the glass shape of the arc tube 10. As a result, the arc image viewed from the outside of the arc tube 10 is apparently larger than the actual arc image or shifts from the actual position of the arc image. In other words, even the light emitted from the electrode 12 adjacent to the first reflecting mirror 20e may be refracted when passing through the glass portion of the arc tube 10 to be emitted to the part other than the reflection area of the first reflecting mirror 20e, thus becoming light that is not used as illuminating light. Therefore, by setting the θe larger than θd where the θe is the angle formed by a line C connecting an opening end B of a reflecting surface 54 of the first reflecting mirror 20e and the end of the electrode adjacent to the first reflecting mirror and a straight light extending to the rear side of the optical axis A, more light emitted from the light-emitting portion 11 can be used as effective illuminating light. In FIG. 6, θe is the angle from the optical-axis extension A behind the electrode 12 adjacent to the first reflecting mirror 20e to the line C in a clockwise direction.

Since the light emitted from the light-emitting portion 11 is not only the light that passes between the electrodes 12 and 12, and the actual arc image overlaps with the end of the electrodes 12, the light from the outside of the space between the ends of the electrodes 12 is also present. Accordingly, when the diameter D2 of the opening end of the reflecting surface 54 of the first reflecting mirror 20e is determined only with θd, light L8 emerging from the arc image at the part overlapping with the electrode 12 adjacent to the first reflecting mirror 20e is emitted to the part other than the reflection area of the first reflecting mirror 20e, thus becoming the light that is not used as illuminating light. Therefore, by setting the intersection point of the boundary light L8 of the light emerging from the arc end Lo adjacent to the first reflecting mirror 20e without interception by the second reflecting mirror 30b and the extension of the reflecting surface 54 of the first reflecting mirror 20e as the opening end B of the first reflecting mirror 20e, the light L8 emerging from the arc end Lo can also be used as effective light.

Furthermore, when the opening end of the first reflecting mirror 20e is set so as to also reflect the light L8, the light emerging from the end of the electrodes 12 and refracted by the glass part of the arc tube 10 can also be reflected by the first reflecting mirror 20e, so that more light emitted from the light-emitting portion 11 can be used as effective illuminating light and required minimum diameter of the opening end of the reflecting surface 54 of the first reflecting mirror 20e can be selected.

For example, when the diameter D2 of the opening end of the reflecting surface 54 of the first reflecting mirror 20e is set in the range to reflect the light beam from θd to θd+10°, almost all of the light emitted from the light-emitting portion 11 can be used.

Next, the procedure of manufacturing the illumination systems 100, 100A, and 100D will be described. While the following is a description about the illumination system 100 including the first reflecting mirror 20a, it should be understood that the same procedure can be used to manufacture the illumination systems 100A and 100D. Data on the structure of the arc tube 10 and the first reflecting mirror 20a is first collected for each arc tube 10. The data includes the inter-electrode distance in the light-emitting portion 11, the shape and size of the components of the arc tube 10, the shape and size of the first reflecting mirror 20a, and the focus of the first reflecting mirror 20a (first and second focuses when the first reflecting mirror is elliptical). Subsequently, the state of emission of the light from the light-emitting portion 11 in the arc tube 10 is simulated on the basis of the data with a computer or the like. A second reflecting mirror 30a corresponding to the arc tube 10 is then designed on the basis of the simulation of the light emission from the light-emitting portion 11. The designing can also be performed by using computer simulation or the like. Through such simulation, the shape (the outside diameter, the inside diameter, and the shape of the reflecting surface) of the second reflecting mirror 30a is determined that allows the function described before to be achieved. The second reflecting mirror 30a corresponding to each arc tube 10 is manufactured on the basis of the design. The second reflecting mirror 30a is mounted to one end of the sealing portion 13 of the arc tube 10 so that the reflecting surface 60 of the second reflecting mirror 30a thus manufactured surrounds about half of the front side of the light-emitting portion 11 and the light emitted from the center of the light-emitting portion 11 and entering the second reflecting mirror 30a agrees with the normal of the reflecting surface 60 of the second reflecting mirror 30a. Accordingly, the second reflecting mirror 30a can be manufactured that has a shape such that the actual arc image between the electrodes in the light-emitting portion 11 and the refraction of the light passing through the glass portion of the arc tube 10 are considered. Furthermore, the position of the second reflecting mirror 30a can be adjusted in correspondence with the light that is actually emitted from the light-emitting portion 11.

The second reflecting mirror 30a can be structurally made of a hollow pipe having an inside diameter larger than the outside diameter of the sealing portion 13 of the arc tube 10. In such a case, the reflecting surface 60 of the second reflecting mirror 30a having a dielectric multilayer can be formed by grinding a thick wall. The grinding for making the second reflecting mirror 30a advantageously needs no complicated grinding control as in general spherical grinding because the reflecting surface 60 is hollow. The second reflecting mirror 30a can also be made by press molding of the pipe. The press molding is very simple, thus greatly reducing manufacturing cost.

The second reflecting mirror 30a can be mounted to the arc tube 10 in the following way: (1) The second reflecting mirror 30a is temporarily fixed to the sealing portion 13 of the arc tube 10 such that half of the front side of the light-emitting portion 11 and the reflecting surface 60 of the second reflecting mirror 30a are opposed to each other while the space between the electrodes 12 and 12 is observed with a CCD camera or the like. (2) The position of the second reflecting mirror 30a is adjusted so that the image between the electrodes 12 and 12 which is projected on the reflecting surface 60 enters the space between the actual electrodes (object point) while the reflecting surface 60 of the second reflecting mirror 30a is observed from a plurality of different directions with the CCD camera or the like. (3) After completion of the adjustment, the second reflecting mirror 30a is fixed to the sealing portion 13 of the arc tube 10. The adjustment after the temporary fixing of the second reflecting mirror 30a corresponding to the above-described (2) is possible also in the following way: Extra-fine laser beams are applied to the reflecting surface 60 of the second reflecting mirror 30a from the plurality of different directions through the space between the electrodes 12 and 12 and the position of the second reflecting mirror 30a is adjusted so that the positions of the beams reflected by the second reflecting mirror 30a and the state of divergence agree with one another, which results in the same consequence as with the CCD camera. Thus, the reflected light by the second reflecting mirror 30a can be accurately returned between the electrodes 12 and 12 and to the first reflecting mirror 20a.

Here the method of alignment of the arc tube 10, the first reflecting mirror 20a, and the second reflecting mirror 30a will be specifically described.

Figure 7:
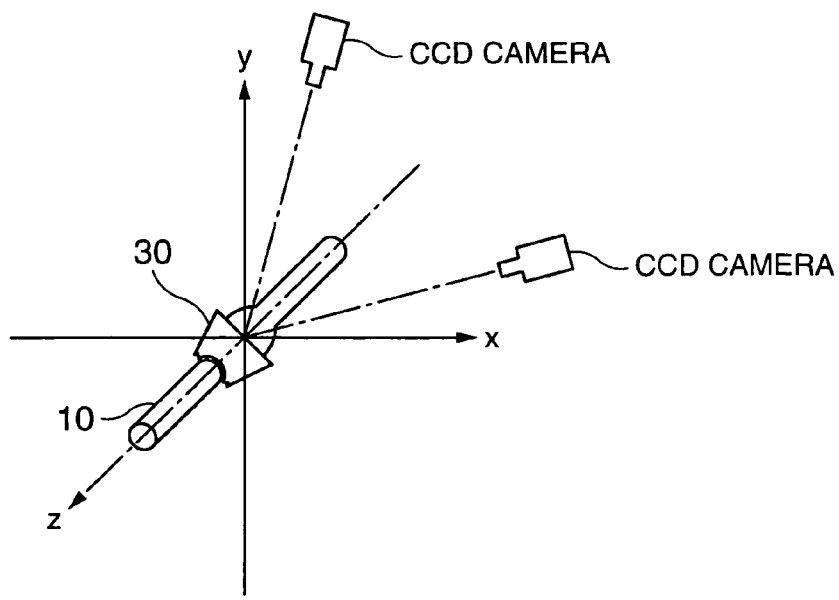
FIG. 7 is an explanatory diagram of the method of positioning an arc tube and the second reflecting mirror.
Figure 7:
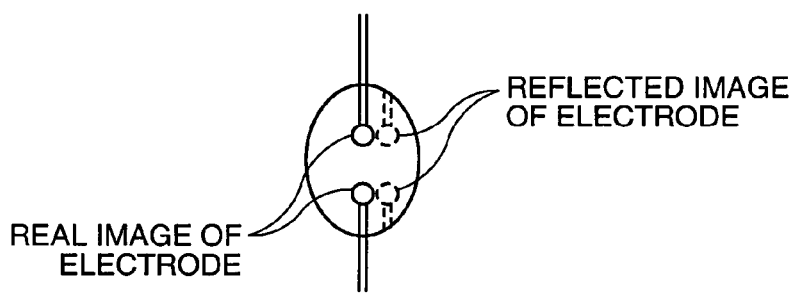
Figure 7:
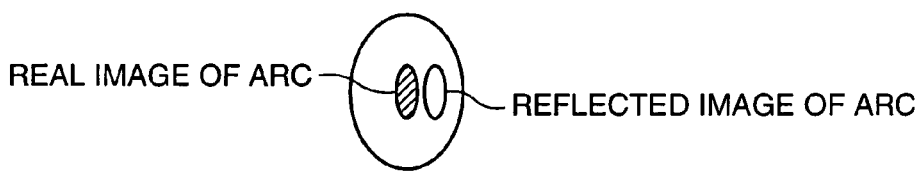

The arc tube 10 and the second reflecting mirror 30a are first fixed while the position of the second reflecting mirror 30a is adjusted so that the real images of the electrodes 12 and 12 of the arc tube 10 or an inter-electrode arc (an arc when the light is on) overlap with the reflected images by the second reflecting mirror 30a. In this case, as shown in FIG. 7, the arc tube 10 and the second reflecting mirror 30a can be fixed to each other in such a way that the real images and the reflected images are detected by using a picked-up image with a camera (a CCD camera or the like) from at least two directions and the position of the second reflecting mirror 30a is adjusted so that the real images and the reflected images are overlapped in each direction. FIG. 7(a) shows an image of photographing from two directions with a CCD camera; FIG. 7(b) shows a basic concept of overlapping the real images of the electrodes with the reflected images; and FIG. 7(c) shows a basic concept of overlapping the real image of an inter-electrode arc with its reflected image when the light is on. The more the directions of adjustment are, the more accurate positioning is performed.

Figure 8:
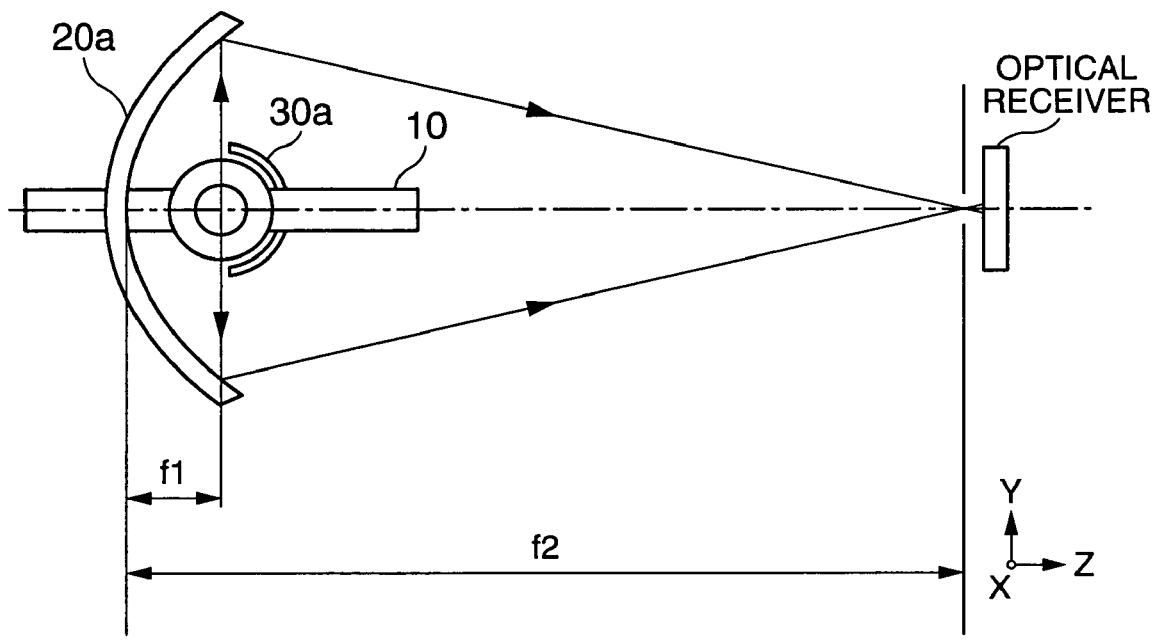
FIG. 8 is an explanatory diagram of the method of positioning the arc tube and the first reflecting mirror.

Next, the first reflecting mirror 20a and the arc tube 10 are then arranged such that the first focus of the first reflecting mirror 20a is substantially agreed with the center between the electrodes of the arc tube 10 to which the second reflecting mirror 30a is fixed and the position of the arc tube 10 is adjusted with respect to the first reflecting mirror 20a so that the luminance in a specified position is maximum. Thus, the arc tube 10 and the first reflecting mirror 20a are fixed together at a proper position. In this case, referring to FIG. 8, the arc tube 10 and the first reflecting mirror 20a can be fixed to each other such that an optical receiver is arranged near the design beam-condensing spot and the relative position between the arc tube 10 and the first reflecting mirror 20a is adjusted along the three axes of x, y, and z so that the luminance of the design beam-condensing spot is maximum while the light emerging from the first reflecting mirror 20a is measured with the optical receiver. While the luminance is measured with the optical receiver in FIG. 8, any other methods may be used as long as the luminance can be measured. Thus, an illumination optical system 300 can be manufactured which has a relative positional relationship between the arc tube 10 and the first reflecting mirror 20a such that the luminance in a specified position is at the maximum.

Figure 11:
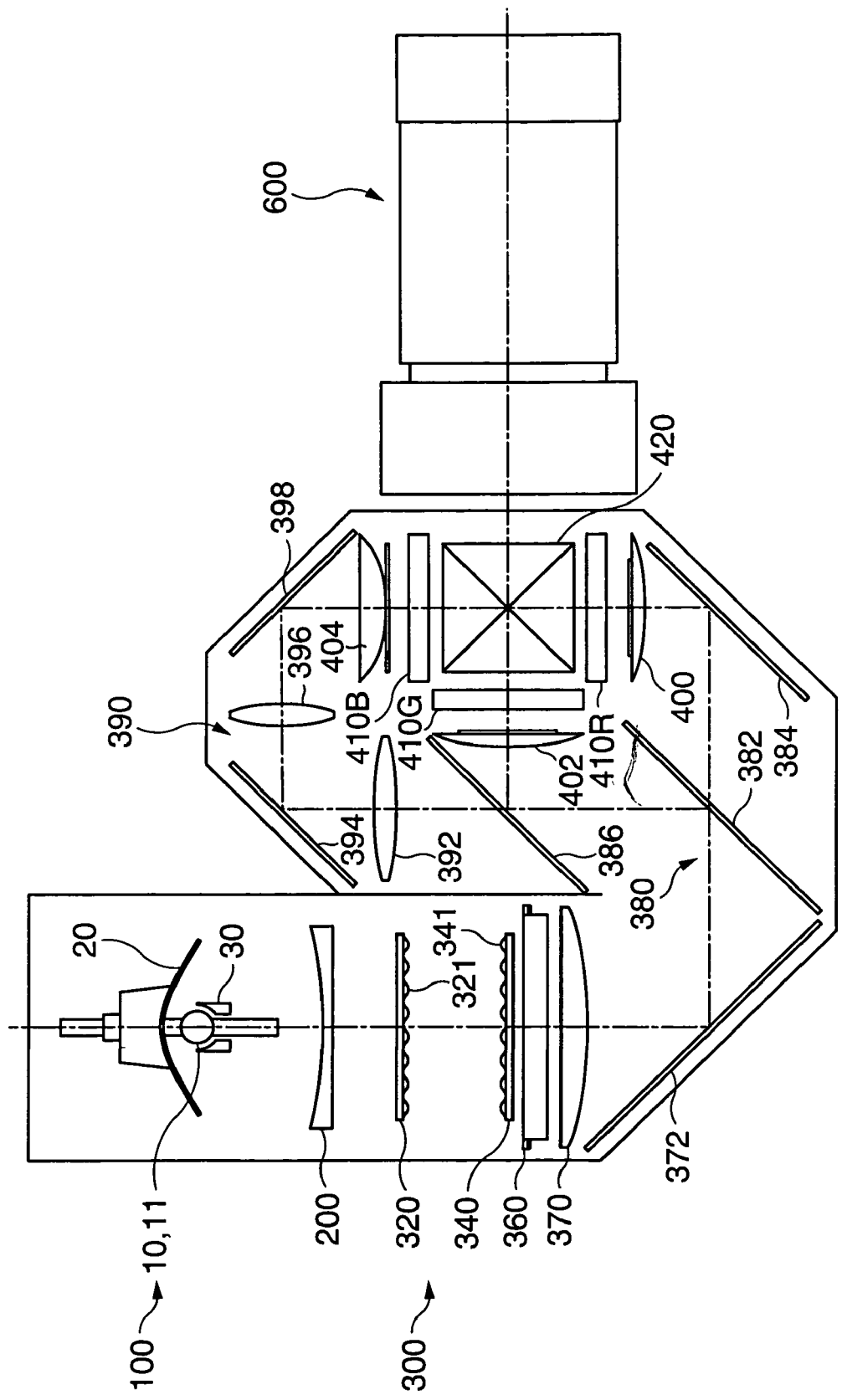
FIG. 11 is a schematic diagram of a projector including the illumination system according to the foregoing embodiments.

In addition, the arc tube 10 and the first reflecting mirror 20a may be fixed to each other such that they are incorporated into an optical system that mounts the illumination system 100, e.g., the illumination optical system 300 shown in FIG. 11, and the relative position between the arc tube 10 and the first reflecting mirror 20a is adjusted along the three axes of x, y, and z so that the luminance of the positions where liquid crystal panels 410R, 410G, and 410B, which are the illumination objects of the illumination optical system 300, are arranged is at the maximum. Thus, the illumination optical system 300 that mounts the illumination system 100 can be manufactured that has the optimum relative positional relationship between the arc tube 10 and the first reflecting mirror 20a also including the relationship with the optical system existing between the illumination system 100 and the illumination object.

The z-axis is parallel to the optical axis of the illumination system 100 and the x-axis and the y-axis are two axes crossing at right angles in the plane perpendicular to the z-axis.

The light use efficiency of the illumination system 100 including the second reflecting mirror 30a can be increased by the alignment of the arc tube 10, the first reflecting mirror 20a, and the second reflecting mirror 30a by the above-described two steps.

The second reflecting mirror 30a is fixed to the arc tube 10 by firmly fixing the second reflecting mirror 30a to the sealing portion 13 of the arc tube 10. For example, when an inorganic adhesive containing a mixture of silica and alumina or aluminum nitride which is resistant to high temperature, as described above, is used in the fixation in addition to known adhesion using cement, uneven distribution in temperature of the second reflecting mirror 30a and the arc tube 10 can be reduced owing to its high thermal conductivity. An example of the adhesive includes "Sumiceram" (manufactured by Asahi Chemical Co., Ltd., a trademark registered by Sumitomo Chemical Co., Ltd.). The adhesive for fixing the arc tube 10 and the second reflecting mirror 30a together is applied by drop bonding (point coating). In order to increase the application quantity, the number of drop bonding points is increased, because it facilitates controlling the amount of adhesive.

When the second reflecting mirror 30a is arranged on the surface of the sealing portion 13 closest to the light-emitting portion 11, the interception of the light emitted from the light-emitting portion 11 and then reflected by the first reflecting mirror 20a and the light emitted from the light-emitting portion 11 and then passing through the second reflecting mirror 30a can be minimized. The adhesive application area is also set within the range to minimize the interception of the light emitted from the light-emitting portion 11 and then reflected by the first reflecting mirror 20a and the light emitted from the light-emitting portion 11 and then passing through the second reflecting mirror 30a.

Figure 9:
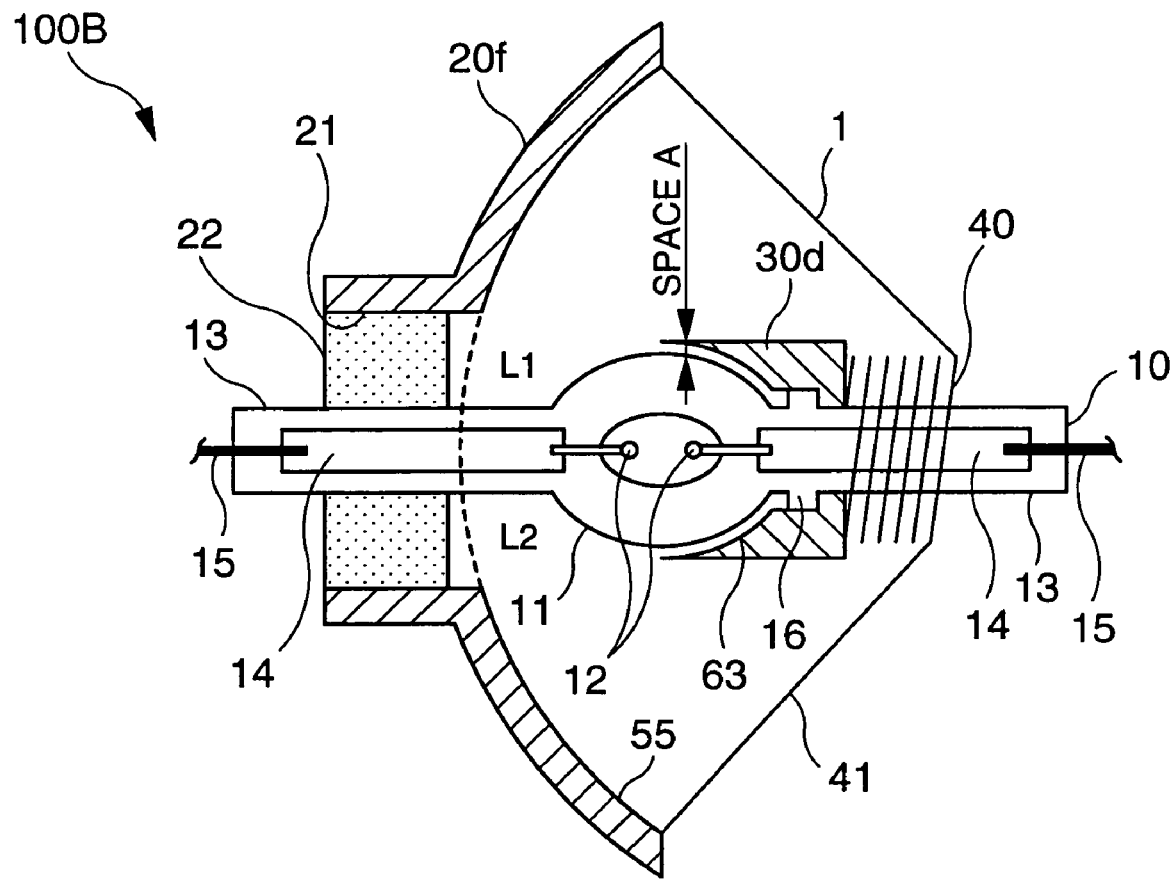
FIG. 9 is a schematic diagram of an illumination system according to a fourth embodiment of the invention;.

FIG. 9 is a schematic diagram of an illumination system 100B according to a fourth embodiment of the present invention. This is different from the illumination system 100 only in the method of fixing the arc tube 10 to a second reflecting mirror 30d. The second reflecting mirror 30d is pressure-fixed to a projection 16 of the sealing portion 13 with a spring 40 wound around the outer circumference of the sealing portion 13 with a space therebetween. The projection 16 is formed separately from the arc tube 10 and is arranged in the position where a space A of 0.2 mm or more can be ensured between the outer circumference of the light-emitting portion 11 and a reflecting surface 63 of the second reflecting mirror 30d. The spring 40 is pushed toward the second reflecting mirror 30d and the projection 16 by two or more tension wires 41 built around the opening end of a first reflecting mirror 20f. Also with such a structure, the second reflecting mirror 30d can be fixed to the arc tube 10. Since the spring 40 is wound around the outer circumference of the sealing portion 13 with a space therebetween, there is no problem because of the clearance even if the sealing portion 13 expands due to heat. An adhesive may be used together for fixing the second reflecting mirror 30d as necessary.

Figure 10:
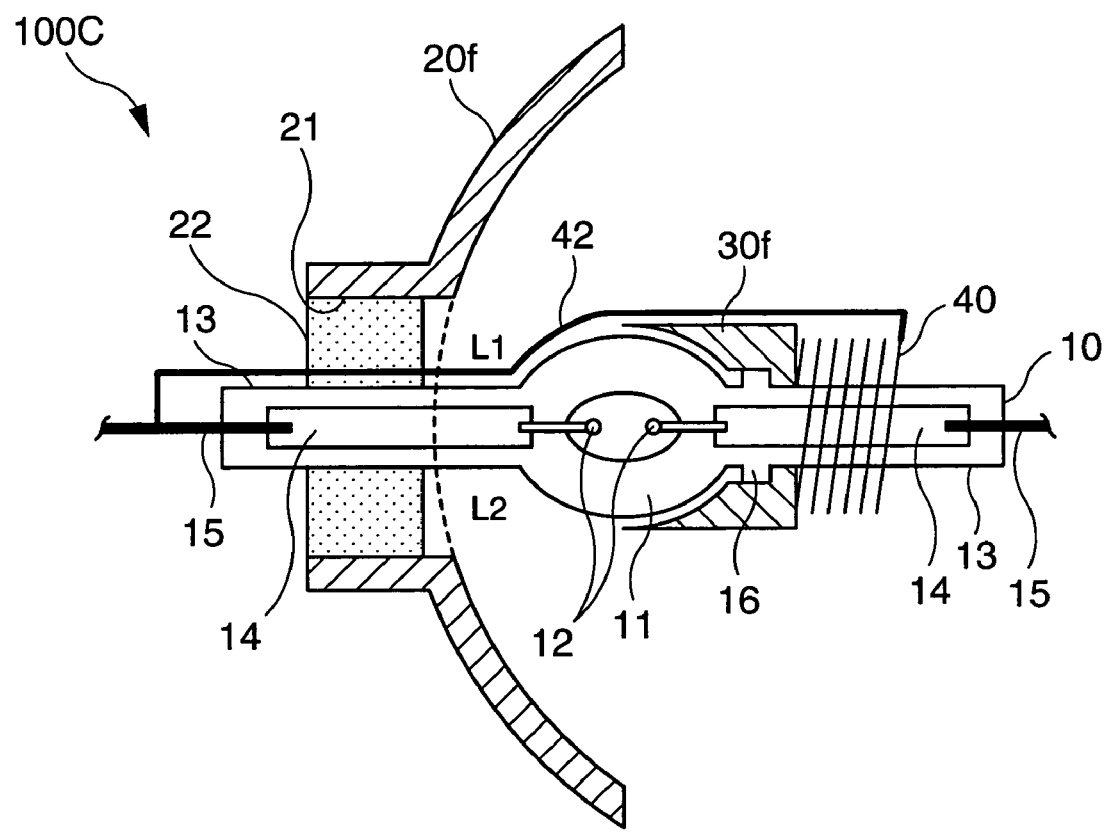
FIG. 10 is a schematic diagram of an illumination system according to a fifth embodiment of the present invention.

FIG. 10 shows an illumination system 100C according to a fifth embodiment of the invention, which is a partial modification of the structure of FIG. 9. Here the spring 40 is formed of a conductive winding, one end of which is electrically connected to a lead wire 15 extending from the sealing portion 13 opposite to the spring 40 through a wire 42 to allow the spring 40 to act as a breakdown trigger wire at the startup of the arc tube 10. This allows a second reflecting mirror 30f to be fixed to the arc tube 10 using the wire 42 and increases the lighting performance of the arc tube 10.

In addition to the above-described adhesive and spring, a fusing part may be provided to either or both of the sealing portion 13 and the second reflecting mirror 30f. Thus, the second reflecting mirror 30f may be fixed to the sealing portion 13 by fusing them with a laser or a gas burner. Although a laser-irradiated part may be blackened with the laser, it does not matter because the fixed part is the sealing portion 13. The aforesaid method for aligning the arc tube 10, the first reflecting mirror 20f, and the second reflecting mirror 30f can employ the manufacturing method for the illumination system 100 irrespective of the difference of the fixing means for the second reflecting mirror 30f.

According to the illumination system 100, 100A, 100B, 100C, and 100D, most of the light emitted from the arc tube 10 can be used without waste. The illumination systems contribute to the miniaturization of the system and improvement of the cooling performance.

FIG. 11 is a schematic diagram of a projector including any of the foregoing illumination systems. A projector that mounts the illumination system 100 will be described hereinafter. The optical system can include the illumination optical system 300 provided with the illumination system 100 having the arc tube 10, the first reflecting mirror 20a, and the second reflecting mirror 30a and the means for adjusting the light emitted from the illumination system 100 into specified light; a color-separation optical system 380 including dichroic mirrors 382 and 386, a reflecting mirror 384 and so on; a relay optical system 390 including an incident-side lens 392, a relay lens 396, and reflecting mirrors 394 and 398; field lenses 400, 402, and 404 corresponding to respective colors of light; the liquid crystal panels 410R, 410G, and 410B serving as an optical modulator; cross-dichroic prism 420 which is a color-combining optical system; and a projection lens 600.

The operation of the projector with the above structure will next be described. The light emitted from the rear side of the center of the light-emitting portion 11 of the arc tube 10 is reflected by the first reflecting mirror 20a to move forward of the illumination system 100. The light emitted from the front side of the center of the light-emitting portion 11 is reflected by the second reflecting mirror 30a to return to the first reflecting mirror 20a and is then reflected by the first reflecting mirror 20a to move forward of the illumination system 100.

The light outgoing from the illumination system 100 enters a concave lens 200, where it is adjusted so that the direction of travel of the light is nearly parallel to the optical axis 1 of the illumination optical system 300, and is then incident on each small lens 321 of a first lens array 320 which constitutes an integrator lens. The first lens array 320 divides the incident light into a plurality of partial beams corresponding to the number of the small lenses 321. Each of the partial beams emerging from the first lens array 320 is incident on a second lens array 340 which constitutes an integrator lens including small lenses 341 each corresponding to the small lens 321. The light emerging from the second lens array 340 is collected near polarization-separation films (not shown) of a polarization-conversion-element array 360. At that time, the light incident on the polarization-conversion-element array 360 is adjusted by a douser (not shown) so as to be incident only on the part corresponding to the polarization-separation films.

The light beams incident on the polarization-conversion-element array 360 are converted to the same kind of linearly polarized light beams. The plurality of partial beams whose directions of polarization are uniformed by the polarization-conversion-element array 360 enter a superimposing lens 370, where the partial light beams that irradiate the liquid crystal panels 410R, 410G, and 410B are adjusted so as to superimpose on the corresponding panel surface.

The color-separation optical system 380 includes the first and second dichroic mirrors 382 and 386 and has the function of separating the light emerging from the illumination optical system into the three colors of light, red, green, and blue. The first dichroic mirror 382 allows a red light component of the light emerging from the superimposing lens 370 to transmit and reflects a blue light component and a green light component. The red light that has pass through the first dichroic mirror 382 is reflected by the reflecting mirror 384 and passes through the field lens 400 to reach the red-light liquid crystal panel 410R. The field lens 400 converts the partial light beams emerging from the superimposing lens 370 to light beams parallel to the central axis (main light ray) thereof. The field lenses 402 and 404 provided ahead of the other liquid crystal panels 410G and 410B act similarly.

Of the blue light and green light reflected by the first dichroic mirror 382, the green light is reflected by the second dichroic mirror 386 and passes through the field lens 402 to reach the green-light liquid crystal panel 410G. On the other hand, the blue light passes through the second dichroic mirror 386 and the relay optical system 390, i.e., the incident-side lens 392, the reflecting mirror 394, the relay lens 396, and the reflecting mirror 398, and further pass through the field lens 404 to reach the blue-light liquid crystal panel 410B. The reason that the relay optical system 390 is used for the blue light is to prevent a decrease in light use efficiency due to the divergence of light because the optical length of the blue light is longer than that of the other color light. In other words, it is to transmit the partial light beams incident on the incident-side lens 392 to the field lens 404 as they are. While the relay optical system 390 is constructed to allow the blue light of the three colors of light to pass through, it may pass the other colors of light such as the red light.

The three liquid crystal panels 410R, 410G, and 410B modulate the respective incident color lights in accordance with given image information to form respective color images. Each of the three liquid crystal panels 410R, 410G, and 410B generally has a polarizing plate on the light incident side and the light emerging side.

The three modulated light beams emitted from the liquid crystal panels 410R, 410G, and 410B enter the cross-dichroic prism 420 serving as the color-combining optical system for combining the modulated light to form a color image. The cross-dichroic prism 420 has a dielectric multilayer that reflects red light and a dielectric multilayer that reflects blue light on the interfaces of four square prisms substantially in X-shape. With the dielectric multilayers, the three modulated color light of red, green, and blue are combined to form combined light for projecting a color image. The combined light combined in the cross-dichroic prism 420 finally enters the projection lens 600, from which it is projected and displayed on a screen as a color image.

According to the projector, both the miniaturization and high luminance of the projector can be achieved by the above-described operation of the illumination system 100 (or 100A, 100B, 100C, and 100D) including the arc tube 10, the first reflecting mirror 20a, and the second reflecting mirror 30a used therein.

While the above embodiments have been described with a projector using a transmissive liquid crystal panel as an example, it should be understood that the invention may be applied to a projector using a reflective liquid crystal panel. The "transmissive" means that the optical modulator, such as a liquid crystal panel, is the type of transmitting light, while the "reflective" means that it is the type of reflecting light. The optical modulator is not limited to the liquid crystal panel, and may be a device using a micromirror. The illumination optical system of the invention may be applied to both of the projector of a front type for performing the projection from the direction observing a screen and the projector of a back type for performing the projection from the side opposite to the direction observing a screen.

The invention claimed is:

1. An illumination system comprising:
    an arc tube including a light-emitting portion that emits light between electrodes and sealing portions that is arranged on both sides of the light-emitting portion;
    a first reflecting mirror that is arranged on a rear side of the light-emitting portion along a longitudinal direction of the arc tube; and
    a second reflecting mirror that is arranged on a front side of the light-emitting portion,
    a diameter D1 on a reflecting surface of the first reflecting mirror, indicated by an available marginal light emitted to the rear side from the light-emitting portion, being larger than a diameter d1 of an outer surface of the second reflecting mirror, and the diameter d1 of the outer surface of the second reflecting mirror being set to a size within the light of the available marginal light reflected by the first reflecting mirror;
    a reflecting surface of the second reflecting mirror surrounding about half of the front side of the light-emitting portion and the light emitted from a center of the light-emitting portion and incident on the second reflecting mirror and a normal of the second reflecting mirror agree with each other; and
    the reflecting surface of the second reflecting mirror being formed by face-grinding or press-molding a pipe having an inside diameter larger than the outside diameter of the sealing portion.

2. The illumination system according to claim 1, the available marginal light being marginal light determined depending on the structure of the arc tube.

3. The illumination system according to claim 1, the second reflecting mirror being arranged to an outer periphery of the light-emitting portion with a space therebetween.

4. The illumination system according to claim 1, the reflecting surface of the second reflecting mirror being formed of a dielectric multilayer that transmits ultraviolet light and infrared light.

5. The illumination system according to claim 1, the outer surface of the second reflecting mirror being formed so as to allow the light incident thereon to transmit.

6. The illumination system according to claim 1, the outer surface of the second reflecting mirror being formed so as to diffuse-reflect the light incident thereon.

7. The illumination system according to claim 1, the second reflecting mirror being made of any of quartz, light-transmissive alumina, crystal, sapphire, YAG, and fluorite.

8. The illumination system according to claim 1, an outer circumference of the light-emitting portion being coated with antireflection coating.

9. The illumination system according to claim 1, the second reflecting mirror being firmly fixed to a surface of a sealing portion in a vicinity of the light-emitting portion with an adhesive.

10. The illumination system according to claim 9, the adhesive being an inorganic adhesive containing a mixture of silica and alumina or aluminum nitride.

11. The illumination system according to claim 1, the second reflecting mirror being pressure-fixed to a vicinity of the light-emitting portion of the arc tube with a spring wound around an outer circumference of a sealing portion with a space therebetween.

12. The illumination system according to claim 11, the spring being formed of a conductive winding, one end of the conductive winding being connected to a lead wire extending from the sealing portion opposite to the spring.

13. A projector, comprising an illumination system and an optical modulator that modulates an incident light from the illumination system in accordance with given image information, the illumination system being the illumination system as recited in claim 1.

14. The projector according to claim 13, the available marginal light being marginal light determined depending on the structure of the arc tube.

15. The projector according to claim 13, the second reflecting mirror being arranged to an outer periphery of the light-emitting portion with a space therebetween.

16. The projector according to claim 13, the reflecting surface of the second reflecting mirror being formed of a dielectric multilayer that transmits ultraviolet light and infrared light.

17. The projector according to claim 13, the reflecting surface of the second reflecting mirror being formed by face-grinding or press-molding a pipe having an inside diameter larger than the outside diameter of the sealing portion.

18. The projector according to claim 13, the outer surface of the second reflecting mirror being formed so as to allow the light incident from the reflecting surface side to transmit.

19. The projector according to claim 13, the outer surface of the second reflecting mirror being formed so as to diffuse-reflect the light incident from the reflecting surface side.

20. The projector according to claim 13, the second reflecting mirror being made of any of quartz, light-transmissive alumina, crystal, sapphire, YAG, and fluorite.

21. The projector according to claim 13, an outer circumference of the light-emitting portion being coated with antireflection coating.

22. The projector according to claim 13, the second reflecting mirror being pressure-fixed to a vicinity of the light-emitting portion of the arc tube with a spring wound around an outer circumference of a sealing portion with a space therebetween.

23. The projector according to claim 22, the spring being formed of a conductive winding, one end of the conductive winding being connected to a lead wire extending from the sealing portion opposite to the spring.

24. The projector according to claim 13, the second reflecting mirror being firmly fixed to a surface of a sealing portion in a vicinity of the light-emitting portion with an adhesive.

25. The projector according to claim 24, the adhesive being an inorganic adhesive containing a mixture of silica and alumina or aluminum nitride.

26. An illumination system, comprising:
an arc tube including a light-emitting portion that emits light between electrodes and sealing portions that is arranged on both sides of the light-emitting portion;
a first reflecting mirror that is arranged on the rear side of the light-emitting portion along a longitudinal direction of the arc tube; and
a second reflecting mirror that is arranged on a front side of the light-emitting portion,
a diameter D1 on a reflecting surface of the first reflecting mirror, indicated by an available marginal light emitted to a rear side from the light-emitting portion being larger than a diameter d1 of an outer surface of the second reflecting mirror, the diameter d1 of an outer surface of the second reflecting mirror being set to a size within the light of the available marginal light reflected by the first reflecting mirror, and the available marginal light being an inside boundary light of a range to be actually used as illuminating light;
the second reflecting mirror being arranged so that the light emitted from a center of the light-emitting portion and incident on the second reflecting mirror and a normal of the second reflecting mirror agree with each other; and
a diameter D2 at the opening end of the reflecting surface of the first reflecting mirror being within the range that satisfies θe>θd when θd is approximated by:

$$\theta d = 90° + \tan^{-1}\{(Le/2 + Lr)/(d2/2)\},$$

where Le is a distance between ends of the electrodes, Lr is a distance on an optical axis of the illumination system from a center F 1 between the ends of the electrodes to an opening end of a reflecting surface of the second reflecting mirror, d2 is a diameter of an opening end of the outer surface of the second reflecting mirror, D2 is a diameter of an opening end of the reflecting surface of the first reflecting mirror, θd is an angle formed between the light emitted from an end of the electrode of the electrode ends adjacent to the first reflecting mirror without interception by the second reflecting mirror and a straight line of the optical axis of the illumination system extending toward the rear side of the illumination system, and θe is an angle formed between a line connecting the opening end of the reflecting surface of the first reflecting mirror and an end of the electrode adjacent to the first reflecting mirror together and a straight line of the optical axis of the illumination system extending toward the rear side of the illumination system.

27. The illumination system according to claim 26, the available marginal light being marginal light determined depending on the structure of the arc tube.

28. The illumination system according to claim 26, the second reflecting mirror being arranged to an outer periphery of the light-emitting portion with a space therebetween.

29. The illumination system according to claim 26, the reflecting surface of the second reflecting mirror being formed of a dielectric multilayer that transmits ultraviolet light and infrared light.

30. The illumination system according to claim 26, the reflecting surface of the second reflecting mirror being formed by face-grinding or press-molding a pipe having an inside diameter larger than the outside diameter of the sealing portion.

31. The illumination system according to claim 26, the outer surface of the second reflecting mirror being formed so as to allow the light incident thereon to transmit.

32. The illumination system according to claim 26, the outer surface of the second reflecting mirror being formed so as to diffuse-reflect the light incident thereon.

33. The illumination system according to claim 26, the second reflecting mirror being made of any of quartz, light-transmissive alumina, crystal, sapphire, YAG, and fluorite.

34. The illumination system according to claim 26, an outer circumference of the light-emitting portion being coated with antireflection coating.

35. The illumination system according to claim 26, the second reflecting mirror being firmly fixed to a surface of a sealing portion in a vicinity of the light-emitting portion with an adhesive.

36. The The illumination system according to claim 35, the adhesive being an inorganic adhesive containing a mixture of silica and alumina or aluminum nitride.

37. The illumination system according to claim 26, the second reflecting mirror being pressure-fixed to a vicinity of the light-emitting portion of the arc tube with a spring wound around an outer circumference of a sealing portion with a space therebetween.

38. The illumination system according to claim 37, the spring being formed of a conductive winding, one end of the conductive winding being connected to a lead wire extending from the sealing portion opposite to the spring.

39. A projector, comprising an illumination system and an optical modulator that modulates an incident light from the illumination system in accordance with given image information, the illumination system being the illumination system as recited in claim 26.

40. The projector according to claim 39, the available marginal light being marginal light determined depending on the structure of the arc tube.

41. The projector according to claim 40, the spring being formed of a conductive winding, one end of the conductive winding being connected to a lead wire extending from the sealing portion opposite to the spring.

42. The projector according to claim 39, the available marginal light being marginal light determined depending on the structure of the arc tube.

43. The projector according to claim 39, the second reflecting mirror being arranged to an outer periphery of the light-emitting portion with a space therebetween.

44. The projector according to claim 39, the reflecting surface of the second reflecting mirror being formed of a dielectric multilayer that transmits ultraviolet light and infrared light.

45. The projector according to claim 39, the reflecting surface of the second reflecting mirror being formed by face-grinding or press-molding a pipe having an inside diameter larger than the outside diameter of the sealing portion.

46. The projector according to claim 39, the outer surface of the second reflecting mirror being formed so as to allow the light incident theron to transmit.

47. The projector according to claim 39, the outer surface of the second reflecting mirror being formed so as to diffuse-reflect the light incident thereon.

48. The projector according to claim 39, the second reflecting mirror being made of any of quartz, light-transmissive alumina, crystal, sapphire, YAG, and fluorite.

49. The projector according to claim 39, an outer circumference of the light-emitting portion being coated with antireflection coating.

50. The projector according to claim 39, the second reflecting mirror being firmly fixed to a surface of a sealing portion in a vicinity of the light-emitting portion with an adhesive.

51. The projector according to claim 50, the adhesive being an inorganic adhesive containing a mixture of silica and alumina or aluminum nitride.

52. A method for manufacturing an illumination system, comprising:

an arc tube including a light-emitting portion that emits light between electrodes and sealing portions that is arranged on both sides of the light-emitting portion;

a first reflecting mirror that is arranged on a rear side of the light-emitting portion along a longitudinal direction of the arc tube and that serves as a main reflecting mirror; and a second reflecting mirror that is arranged on a front side of the light-emitting portion and that serves as an auxiliary reflecting mirror, the method comprising:

fixing the arc tube and the second reflecting mirror together, after adjusting a relative position between the second reflecting mirror and the arc tube such that real images of the electrodes or real image of an interelectrode arc of the arc tube overlap with the reflected images of the electrodes or the reflected image of the interelectrode arc reflected by the second reflecting mirror;

fixing the tube and the first reflecting mirror together, after arranging the arc tube and the first reflecting mirror such that a center of the electrodes of the arc tube having the second reflecting mirror fixed thereto substantially agrees with a first focus of the first reflecting mirror and adjusting a relative position between the arc tube and the first reflecting mirror so that a luminance of the first reflecting mirror is maximum in a specified position; and fixing the arc tube the second reflecting mirror together further comprising a process of detecting real image and reflected image from at least two directions by using a pickup image with a camera, adjusting the position of the second reflecting mirror so that the real image overlaps with the reflected image in each direction, and fixing the arc tube and the second reflecting mirror together.

53. The method for manufacturing an illumination system according to claim 52, a specified position being a design beam-condensing spot of the first reflecting mirror; and the step of fixing the arc tube and the first reflecting mirror together including the process of fixing the arc tube and the first reflecting mirror together after adjusting the relative position between the arc tube and the first reflecting mirror so that the luminance in a vicinity of the design second focus of the first reflecting mirror is maximum.

54. The method for manufacturing an illumination system according to claim 52, a specified position being a position at which an illumination object of an optical system that mounts the illumination system can be arranged; and the step of fixing the arc and the first reflecting mirror together including the process of fixing the arc tube and the first reflecting mirror together after incorporating the illumination system to the optical system and adjusting a relative position between the arc tube and the first reflecting mirror so that the luminance at the position in which the illumination object is arranged, becomes maximum.

* * * * *